(12) United States Patent
Ito

(10) Patent No.: US 12,108,117 B2
(45) Date of Patent: Oct. 1, 2024

(54) MANAGEMENT SERVER AND MANAGEMENT PROGRAM

(71) Applicant: OMNIVISION CO., LTD., Tokyo (JP)

(72) Inventor: Yasuyuki Ito, Tokyo (JP)

(73) Assignee: OMNIVISION CO., LTD., Tokyo (JP)

( * ) Notice: Subject to any disclaimer, the term of this patent is extended or adjusted under 35 U.S.C. 154(b) by 0 days.

(21) Appl. No.: 18/246,767

(22) PCT Filed: Apr. 8, 2022

(86) PCT No.: PCT/IB2022/053305
§ 371 (c)(1),
(2) Date: Mar. 27, 2023

(87) PCT Pub. No.: WO2022/175929
PCT Pub. Date: Aug. 25, 2022

(65) Prior Publication Data
US 2023/0336832 A1    Oct. 19, 2023

(30) Foreign Application Priority Data

Feb. 19, 2021   (JP) .................................. 2021-025058

(51) Int. Cl.
*H04N 21/4784* (2011.01)
*H04N 21/254* (2011.01)
*H04N 21/478* (2011.01)

(52) U.S. Cl.
CPC ..... *H04N 21/4784* (2013.01); *H04N 21/2542* (2013.01); *H04N 21/47815* (2013.01)

(58) Field of Classification Search
CPC ..................... H04N 21/4784; H04N 21/47815
See application file for complete search history.

(56) References Cited

U.S. PATENT DOCUMENTS

2018/0012245 A1*   1/2018  Parker ................ G06Q 30/0253

FOREIGN PATENT DOCUMENTS

| JP | 2001-117847 A | 4/2001 |
|---|---|---|
| JP | 2007-249834 A | 9/2007 |

(Continued)

OTHER PUBLICATIONS

International Search Report of PCT/IB2022/053305 mailed Jul. 5, 2022 and English translation thereof.

(Continued)

*Primary Examiner* — Sumaiya A Chowdhury
(74) *Attorney, Agent, or Firm* — Muncy, Geissler, Olds & Lowe, P.C.

(57) ABSTRACT

A management server grants a reward to a provider of a video contributing to commodity's sales. The server determines whether a commodity introduction video conforms to a commodity introduction rule, registers the commodity introduction video, recommended store information in association with the commodity introduction video when a recommended store is introduced at a commodity purchase time, issues a viewing completion ID and registers the viewing completion ID in association with a user ID when viewing of the commodity introduction video by the user satisfies a predetermined condition, certifies that the user has purchased a commodity in the recommended store, and determines a reward to the video provider according to a predetermined reward determination rule when the purchase of the commodity in the recommended store by the user who has acquired the viewing completion ID is certified.

20 Claims, 8 Drawing Sheets

(56) References Cited

FOREIGN PATENT DOCUMENTS

| | | | |
|---|---|---|---|
| JP | 2008-234436 A | 10/2008 | |
| JP | 2008250920 A | * 10/2008 | ............ G06Q 30/00 |
| JP | 2011-014077 A | 1/2011 | |
| JP | 2011-134251 A | 7/2011 | |
| JP | 2019-036203 A | 3/2019 | |
| JP | 2021-005329 A | 1/2021 | |
| WO | 2012/002485 A1 | 1/2012 | |

OTHER PUBLICATIONS

Office Action of the corresponding JP application No. 2021-025058A mailed Sep. 7, 2021 and English translation thereof.

* cited by examiner

Fig. 4A
COMMODITY INFORMATION INTRODUCTION SCREEN (EXAMPLE)

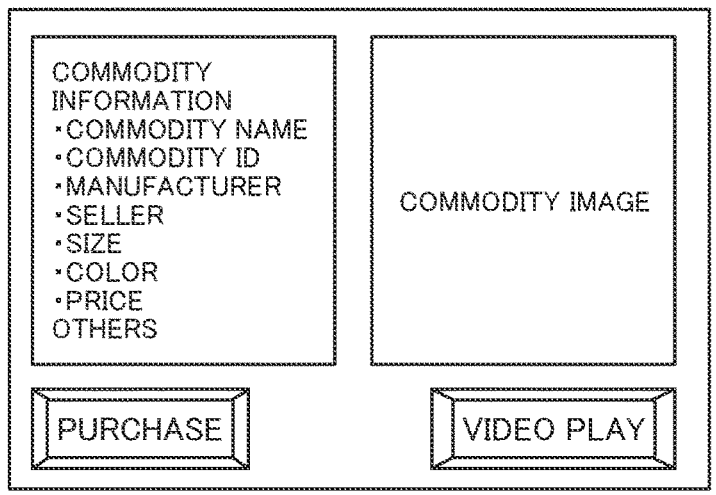

WHEN PLURALITY OF COMMODITY INTRODUCTION VIDEOS ARE PRESENT, COMMODITY INTRODUCTION VIDEO IS SELECTABLE

Fig. 4B
COMMODITY INTRODUCTION VIDEO PLAY SCREEN (EXAMPLE)

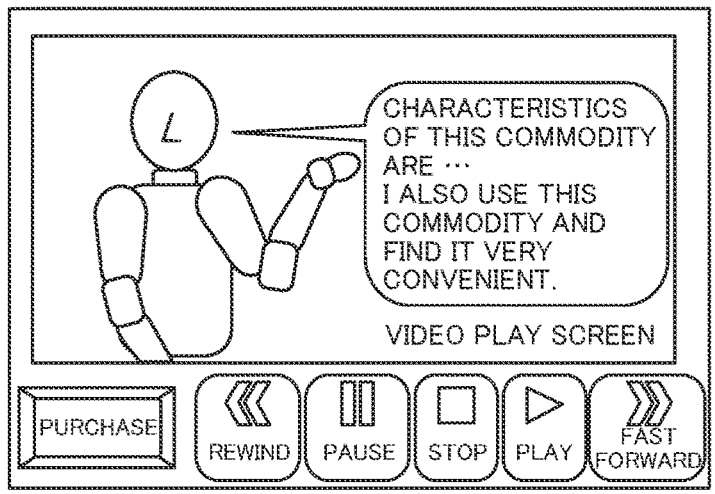

COMMODITY INTRODUCTION VIDEO IS STARTED BY VIDEO PLAY BUTTON
PAUSE, PLAY, FAST FORWARD, REWIND, AND THE LIKE ARE ALSO POSSIBLE DURING VIDEO VIEWING

Fig. 4C
EXAMPLE OF DISPLAY OF RECOMMENDED STORE

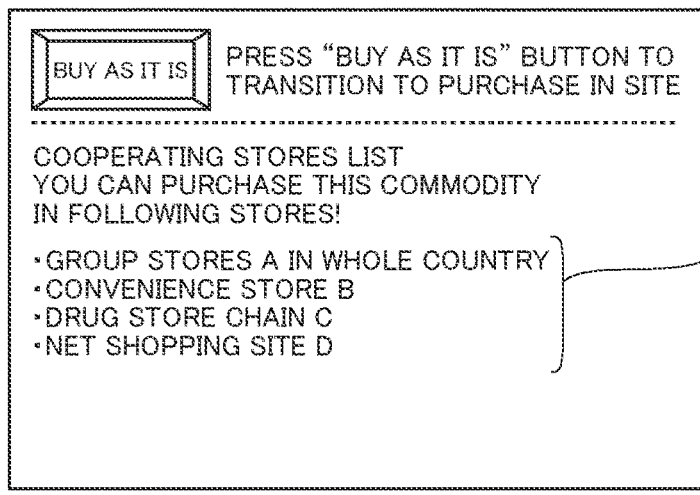

LINK BUTTON IS PROVIDED OR STORE NAMES ARE GUIDED BY LINK TO TRANSITION TO PAGES OF STORES

MANAGEMENT SERVER AND MANAGEMENT PROGRAM

TECHNICAL FIELD

The present invention relates to a management server and a management program for appropriately granting a reward to a provider of a video contributing to sales of commodities.

BACKGROUND ART

Conventionally, a commodity seller sometimes posts an advertisement for commodity sales on a website via a communication network such as the Internet. For example, Patent Literature 1 discloses a system that posts a banner advertisement on a website on which content introducing commodities is posted and guides users to a website operated by a commodity seller.

CITATION LIST

Patent Literature

Patent Literature 1: JP 2001-117847 A

SUMMARY OF INVENTION

Technical Problem

Incidentally, in recent years, commodity introduction videos introducing commodities recommended by video providers are increasingly distributed. There is an advantage that viewers can learn characteristics of commodities in detail through videos and there is an advantage that the sense of use can be visually recognized through videos. Since there are users who purchase commodities by being triggered by such a commodity introduction video, it can be said that the video provider of the commodity introduction video contributes to the sales promotion of the commodity, but there is no mechanism for evaluating the contribution of the commodity introduction video and presenting a reward.

It is also possible to guide users to a specific store by recommending purchase at the specific store in the commodity introduction video, but there is no mechanism for evaluating contribution to the guidance of the users and presenting a reward.

An object of at least one embodiment of the present invention is to solve the above problems and to provide a management server and a management program for appropriately granting a reward to a provider of a video contributing to sales of commodities.

Solution to Problem

A management server according to the present invention includes: commodity introduction rule registering means for registering, for each commodity, a predetermined commodity introduction rule that needs to be observed concerning creation of a commodity introduction video for introducing a commodity; commodity introduction video registering means for receiving the commodity introduction video created and transmitted by a video provider, determining whether the commodity introduction video conforms to the commodity introduction rule, and registering the commodity introduction video conforming to the commodity introduction rule in association with a commodity corresponding thereto; recommended store registering means for registering recommended store information in association with the commodity introduction video when a recommended store is introduced at a time of commodity purchase in the commodity introduction video; viewing completion ID issuing means for issuing a viewing completion ID and registering the viewing completion ID in association with a user ID that identifies a user when viewing of the commodity introduction video by the user satisfies a predetermined condition; recommended store purchase certifying means for certifying that the user who has acquired the viewing completion ID has purchased a commodity in the recommended store introduced in the commodity introduction video; reward determining means for determining a reward to the video provider according to a predetermined reward determination rule decided in advance when the recommended store purchase certifying mean certifies that the commodity related to the viewing completion ID is purchased in the recommended store by the user who has acquired the viewing completion ID; and reward processing means for executing processing based on the reward determined by the reward determining means.

With the above configuration, it is possible to appropriately grant a reward to the video provider of the commodity introduction video who guides the user to the recommended store and contributes to the purchase of the commodity by the user. Furthermore, since an appropriate reward can be granted, improvement in quality of the commodity introduction video can be expected.

In the management server according to the present invention, the recommended store purchase certifying means may receive identification information for identifying the purchaser and commodity purchase information transmitted from a store terminal used at the time of the purchase of the commodity, a store server, a settling means operation server, or a user terminal used at the time of the purchase, specify the user ID owned by the purchaser indicated by the identification information, and determine whether the viewing completion ID is registered in association with the user ID to certify that the user who has acquired the viewing completion ID has purchased the commodity at the recommended store.

With the above configuration, it is possible to identify the user based on the identification information for identifying the purchaser transmitted from the store terminal, the store server, the settling means operation server, or the user terminal used at the time of the purchase.

In the management server according to the present invention, the identification information may be a, ID for settling means registered in association with the user for use of the settling means, and the recommended store purchase certifying means may refer to a database that stores in advance a correspondence relation between the user ID and the ID for settling means registered in association with the same user to specify the user ID of the user who has used the ID for settling means for the purchase of the commodity.

With the above configuration, it is possible to identify the user based on the ID for settling means for use of the settling means used by the user to purchase the commodity.

In the management server according to the present invention, the recommended store purchase certifying means may receive the viewing completion ID and the commodity purchase information presented at the time of the purchase to the store terminal or the store server used by the user at the time of the purchase of the commodity from the store terminal or the store server to certify that the user who has acquired the viewing completion ID has purchased the commodity in the recommended store.

With the above configuration, it is possible to certify that the user has purchased the commodity in the recommended store after acquiring the viewing completion ID concerning the commodity introduction video with the viewing completion ID presented to the store terminal or the store server by the user when purchasing the commodity.

The management server according to the present invention may further include specifying means for specifying one or two or more of the commodity introduction videos contributing to the purchase of the commodity according to a predetermined specifying rule decided in advance out of a plurality of the commodity introduction videos when the user has acquired a plurality of the viewing completion IDs issued based on the plurality of commodity introduction videos when the recommended store purchase certifying means certifies that the commodity related to the viewing completion ID has been purchased in the recommended store by the user who has acquired the viewing completion ID, and the reward determining means determines a reward to a video provider of the one or two or more commodity introduction videos specified by the specifying means.

With the above configuration, when there are a plurality of video providers who have provided commodity introduction videos for guiding the user to the recommended store, a reward can be granted to one or two or more video providers of the commodity introduction videos that have contributed to the purchase of the commodity. Therefore, the number of video providers to which the reward is granted can be limited. Consequently, competition concerning the commodity introduction videos is generated and, as a result, improvement in the quality of the commodity introduction videos can be expected.

A management program according to the present invention causes a management server to realize: a commodity introduction rule registering function of registering, for each commodity, a predetermined commodity introduction rule that needs to be observed concerning creation of a commodity introduction video for introducing a commodity; a commodity introduction video registering function of receiving the commodity introduction video created and transmitted by a video provider, determining whether the commodity introduction video conforms to the commodity introduction rule, and registering the commodity introduction video conforming to the commodity introduction rule in association with a commodity corresponding thereto; a recommended store registering function of registering recommended store information in association with the commodity introduction video when a recommended store is introduced at a time of commodity purchase in the commodity introduction video; a viewing completion ID issuing function of issuing a viewing completion ID and registering the viewing completion ID in association with a user ID that identifies a user when viewing of the commodity introduction video by the user satisfies a predetermined condition; a recommended store purchase certifying function of certifying that the user who has acquired the viewing completion ID has purchased a commodity in the recommended store introduced in the commodity introduction video; a reward determining function of determining a reward to the video provider according to a predetermined reward determination rule decided in advance when the recommended store purchase certifying mean certifies that the commodity related to the viewing completion ID is purchased in the recommended store by the user who has acquired the viewing completion ID; and a reward processing function of executing processing based on the reward determined by the reward determining function.

With the above configuration, it is possible to appropriately grant a reward to the video provider of the commodity introduction video who guides the user to the recommended store and contributes to the purchase of the commodity by the user. Furthermore, since an appropriate reward can be granted, improvement in quality of the commodity introduction video can be expected.

Advantageous Effects of Invention

According to the present invention, it is possible to appropriately grant a reward to a video provider of a commodity introduction video who has guided a user to a recommended store and contributed to purchase of a commodity by the user. Furthermore, since an appropriate reward can be granted, improvement in quality of the commodity introduction video can be expected. Further, since the store introduced as the recommended store in the commodity introduction video can be expected to improve the sales because the customer who purchases the commodity is guided to the store, it can be said that there is an advantage even if a part or all of the reward is borne by the store introduced as the recommended store.

BRIEF DESCRIPTION OF DRAWINGS

FIG. 4 is an explanatory diagram for explaining an example of video distribution provided based on the management server 10 according to the present invention.

DESCRIPTION OF EMBODIMENTS

First Embodiment

A commodity sales service according to a first embodiment of the present invention is characterized in that, when a store where purchase is recommended is introduced in a commodity introduction video contributing to sales of a commodity and a user, who is a viewer, purchases the commodity at the introduced store, a reward is granted to a video provider who provides the commodity introduction video. In the following explanation a configuration for realizing the commodity sales service is explained. Note that, although the term "commodity" is used, the term "commodity" is used to include not only articles such as electrical commodities, bicycles, and sporting goods but also services such as insurance and travel application, digital content, and game tickets. The commodity sales service can be utilized not only for pay services but also for guidance to free services, participation in questionnaires and votes, free distribution of free sample commodities, and the like.

Figure 1:
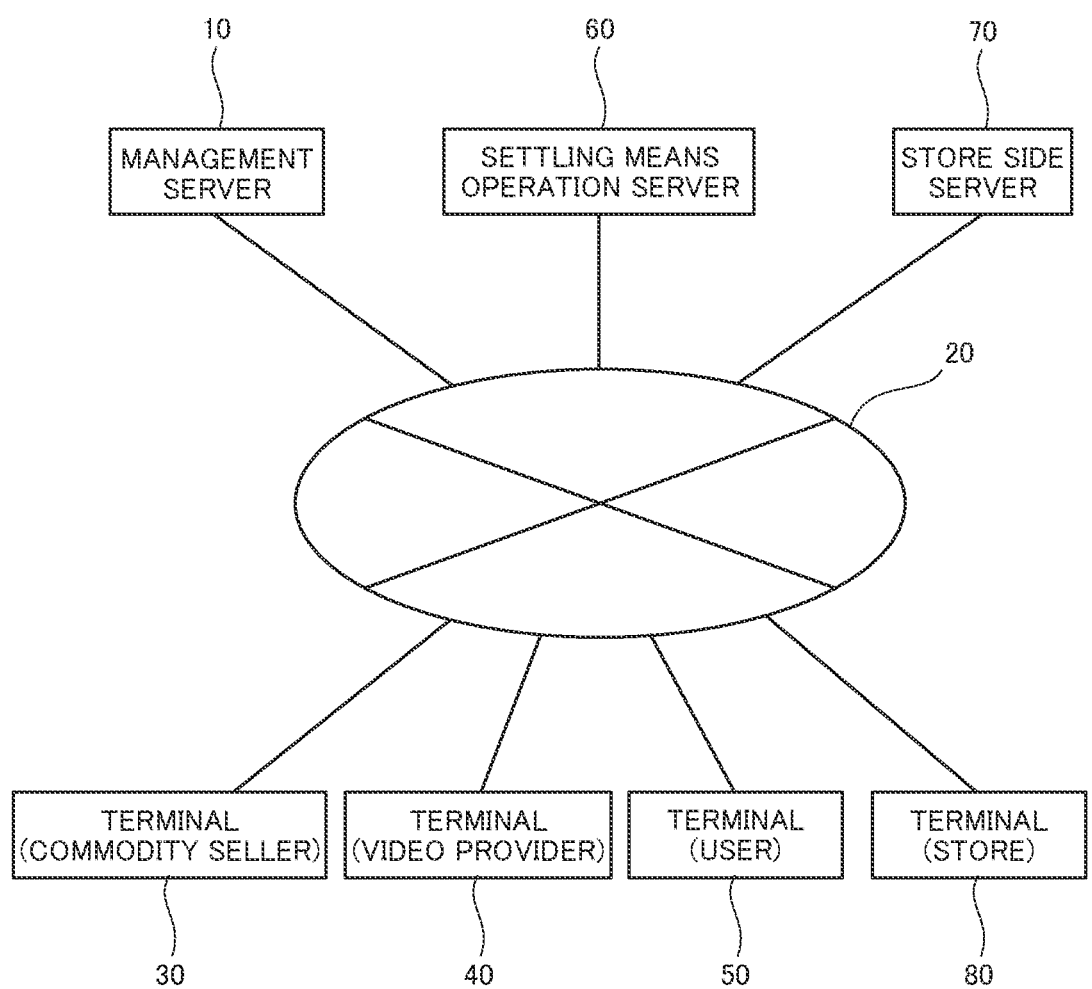
FIG. 1 is a block diagram illustrating a configuration of an entire system for realizing a commodity sales service.

In the following explanation, an overview of a commodity sales service according to the present invention is explained with reference to the drawings. FIG. 1 is a block diagram illustrating a configuration of an entire system for realizing a commodity sales service. In the system for realizing the commodity sales service, for example, a management server 10, a terminal 30 of a commodity seller, a terminal 40 of a video provider, a terminal 50 of a user, a settling means operation server 60, a store side server 70, a store terminal 80, and the like are connected via a communication network 20 such as the Internet. Note that the configuration of the system is not limited this and a single terminal may be used by a plurality of persons or the system may include a plurality of servers.

The terminal 30 of the commodity seller is a terminal used by the commodity seller to register various kinds of information in the management server 10.

The terminal 40 of the video provider is a terminal used by the video provider to register various kinds of information in the management server and to upload a created commodity introduction video to and register the created commodity introduction video in the management server 10. Note that an upload destination of the video does not need to be the management server 10.

The terminal 50 of the user is a terminal including at least a function of viewing the commodity introduction video.

The settling means operation server 60 is a server managed by an entity that operates settling means. For example, a server operated by a credit card company, a server operated by a company that manages settlement by electronic money or a point program, and the like are conceivable. In the settling means operation server 60, an ID for settling means is managed in association with personal information of a user who uses the settling means.

The store side server 70 and the store terminal 80 are for managing various kinds of information in a store that sells commodities. Here, the "store" in the present invention includes not only a real store having a location in a real space but also a store specialized for Internet shopping such as an EC site. Each of the store side server 70 and the store terminal 80 may be configured to be independently communicable with the management server 10 or the store terminal 80 may be communicable with the store side server 70 and configured to communicate with the management server 10 via the store side server 70. Note that, as the store terminal 80, a point of sale (POS) terminal and the like are also assumed besides a PC (Personal Computer), a smartphone, a tablet terminal, and the like.

In FIG. 1, a single terminal 30 of the commodity seller is illustrated. However, naturally, a plurality of terminals 30 of the commodity seller may be present. That is, a plurality of commodity sellers may use the commodity sales service using the terminals 30 of the plurality of commodity sellers connected to the communication network 20 and accessible to the management server 10. Similarly, a plurality of video providers and a plurality of users may use the commodity sales service using the terminals 40 and 50 of the plurality of video providers and the plurality of users.

In FIG. 1, the management server 10 managed by the operation entity of the commodity sales service, the terminal 30 of the commodity seller, the terminal 40 of the video provider, the settling means operation server 60, the store side server 70, and the store terminal 80 are respectively explained as servers or terminals by different entities. However, in some cases, these entities plays a plurality of roles, for example, it is assumed that an operation entity of a commodity sales service is also the commodity seller or the operation entity of the commodity sales service is also the video provider. Therefore, the servers and terminals are not limited to the case illustrated in FIG. 1.

The management server 10 is configured with, for example, one or more processors, memory, input and output devices. As discussed above, the management server communicates with other devices via the communication network 20, such as the Internet. The processors execute processes related to the present invention following stored programs using the memory.

Note that the terminal 30 of the commodity seller, the terminal 40 of the video provider, and the terminal 50 of the user in FIG. 1 are assumed to be a PC (Personal Computer), a smartphone, a television receiver, a tablet terminal, or the like.

Figure 2:
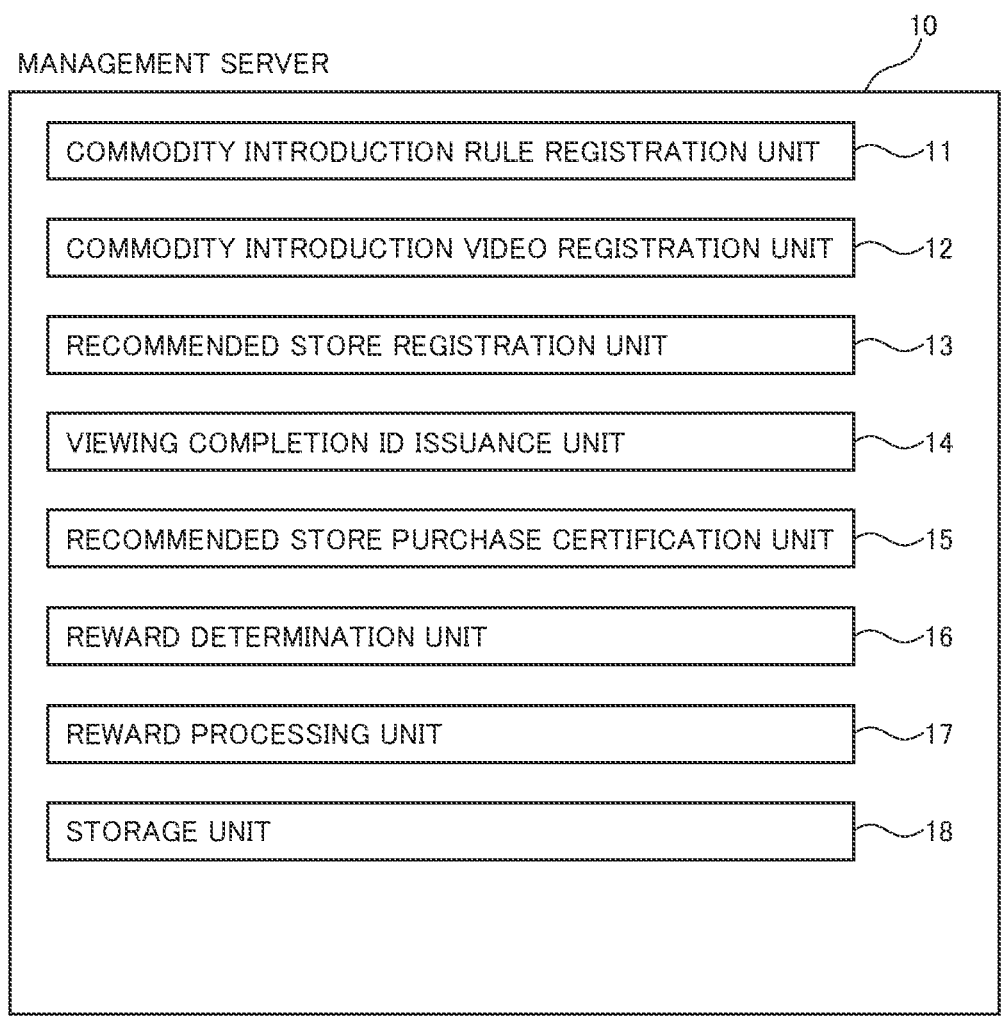
FIG. 2 is a block diagram illustrating an example of a configuration of a management server 10.

FIG. 2 is a block diagram illustrating an example of a configuration of the management server 10. As illustrated in FIG. 2, the management server 10 includes a commodity introduction rule registration unit 11, a commodity introduction video registration unit 12, a recommended store registration unit 13, a viewing completion ID issuance unit 14, a recommended store purchase certification unit 15, a reward determination unit 16, a reward processing unit 17, and a storage unit 18.

The commodity introduction rule registration unit 11 has a function of registering, for each commodity, predetermined commodity introduction rules that need to be observed concerning creation of a commodity introduction video for introducing the commodity. The commodity introduction rules include one or two or more rules. Examples set as the commodity introduction rules include necessarily introducing predetermined items concerning commodities, introducing the predetermined items using predetermined expressions, and introducing the predetermined items in predetermined order. The commodity introduction rule includes a method of determining a reward to be granted when a commodity is sold. By deciding the commodity introduction rules, it is possible to maintain the quality of the commodity introduction video provided by the provider. Even when a plurality of video providers respectively provide commodity introduction videos in order to introduce the same commodity, it is possible to cause the plurality of video providers to compete in a state in which while certain quality is maintained. Note that the video provider agrees with the commodity introduction rules and creates the commodity introduction video. For example, the provider transmits information indicating that the provider agrees with the commodity description rule to the management server 10 using its own terminal 40.

Note that the commodity introduction rules may be set for each predetermined classification of efficacy, function, design, and the like in one commodity. In that case, the video provider agrees with the respective commodity introduction rules for each predetermined classification and creates a plurality of commodity introduction videos conforming to the respective commodity introduction rules. For example, the video provider may transmit, from the terminal 40 to the management server 10, an indication that the video provider collectively agrees with all commodity explanation rules corresponding to a plurality of classifications or may transmit, from the terminal 40 to the management server 10, an indication that the video provider collectively agrees with only commodity explanation rules common to the plurality of classifications or an indication that the video provider individually agrees with the commodity explanation rules completely for each classification.

A condition for the video provider who creates the commodity introduction video may be set as the commodity introduction rules. Examples of the condition for the video provider include being familiar with a field to which the commodity belongs. For example, as a condition for the video provider in the case in which the commodity is an exercise tool, it is conceivable that the video provider has three or more years of trainer experience in a sports gym. For example, as a condition for the video provider in the case in which the commodity is wine, it is conceivable that the video provider has a sommelier qualification. By setting the condition for the video provider according to the commodity to be sold, it is possible to receive only provision of a high-quality commodity introduction video based on experience and knowledge.

The commodity introduction video registration unit 12 has a function of receiving a commodity introduction video created and transmitted by the video provider, determining whether the commodity introduction video conforms to the commodity introduction rules, and registering the commodity introduction video conforming to the commodity introduction rules in association with a commodity corresponding to the commodity introduction video. After the commodity introduction video is provided to the management server 10, it is confirmed whether content of the commodity introduction video conforms to the commodity introduction rule at the time of registration and the commodity introduction video is linked with the introduced commodity. For example, among the commodity introduction rules, confirmation as to whether a video time is within a designated range may be automatically performed. On the other hand, for example, whether commodities are explained in predetermined order is confirmed by the commodity seller, the commodity sales service operator, or an outsider to whom service operation is entrusted. When it is confirmed that the provided commodity introduction video conforms to the commodity introduction rules, the commodity introduction video registration unit 12 registers the commodity introduction video on the management server 10. Note that a provider who introduces the commodity does not always need to appear in the commodity introduction video. For example, the commodity seller may approve the commodity introduction video and link the commodity introduction video with the commodity without confirming whether the content of the commodity introduction video conforms to the commodity introduction rules.

The commodity introduction video registration unit 12 may link one commodity introduction video with a plurality of commodities. Specifically, the commodity introduction video registration unit 12 may link a commodity introduction video for introducing a plurality of commodities with the plurality of commodities. Examples of a case in which a plurality of commodities include a case in which a plurality of commodities are used as a set, a case in which a plurality of commodities are delivered to a user in every period, and a case in which commodities are regularly purchased. Since the commodity can be introduced according to the sales form of the commodity in this way, it is possible to introduce the commodity more attractively.

The recommended store registration unit 13 has a function of registering the recommended store information in association with the commodity introduction video when the recommended store is introduced at the time of commodity purchase in the commodity introduction video. The recommended store is a store introduced in the commodity introduction video as a store where purchase is recommended by the video provider among stores that sell the commodity introduced in the commodity introduction video. One recommended store may be introduced in one commodity introduction video or two or more recommended stores may be introduced in one commodity introduction video. For the registration of the recommended store, for example, the video provider transmits a list indicating the recommended store information introduced in the commodity introduction video from the terminal 40 to the management server 10 and the recommended store registration unit 13 of the received management server 10 that receives the list registers the recommended store information in association with the commodity introduction video.

The viewing completion ID issuance unit 14 has a function of issuing a viewing completion ID and registering the viewing completion ID in association with a user ID for identifying a user when viewing of the commodity introduction video by the user satisfies a predetermined condition. Here, the viewing completion ID is information indicating that the user has viewed the commodity introduction video. It is preferable that it is possible to uniquely specify, with one viewing completion ID, which user views which commodity introduction video. The predetermined condition for issuing the viewing completion ID may be any condition. For example, it is unnecessary to view all commodity introduction videos but viewing of a predetermined part set in advance may be set as a condition for issuing the viewing completion ID. It is conceivable to set the predetermined part to, for example, a part including content introducing a main function of the commodity, content introducing a unique feature of the commodity, and the like. With such a condition, it is possible to issue the viewing completion ID only to a user who has viewed the part introducing the feature of the target commodity set as the predetermined part. For example, a condition that a predetermined ratio or more of a play time of the commodity introduction video has been played may be set as the predetermined condition. With such a condition, the viewing completion ID is not issued in the case of viewing that is started to be reproduced but is immediately interrupted and is hardly reproduced. When the viewing completion ID is issued, the viewing completion ID is registered in association with a user ID that can identify the user who has viewed the commodity introduction video. Note that the user ID may be any ID if the user can be specified and may be an ID issued by an operation entity of a commodity sales service provided by the system of the present invention or a user ID issued by another entity may be used.

The recommended store purchase certification unit 15 has a function of certifying that the user who has acquired the viewing completion ID has purchased the commodity in the recommended store introduced in the commodity introduction video. Any means may be used if it is possible to certify that the user who has acquired the viewing completion ID has purchased the commodity in the recommended store introduced in the commodity introduction video. However, for example, it is conceivable to adopt a method of receiving identification information for identifying a purchaser and commodity purchase information transmitted from a store terminal, a store server, or a settling means operation server used at the time of purchase of the commodity or a user terminal used by the user at the time of purchase, specifying a user ID owned by the purchaser indicated by the identification information, and determining whether the viewing completion ID is registered in association with the user ID to certify that the user who has acquired the viewing completion ID has purchased the commodity at the recommended store. Here, the identification information for identifying the purchaser may be any identification information. However, for example, an ID to be allocated to a membership card or a point card managed in a store is conceivable. As the identification information, a credit card, electronic money, an ID for identifying a user in a point program that can be used like cash usable in common among a plurality of businesses, and the like are also assumed. In addition, the commodity purchase information refers to information for specifying a commodity purchased by the user indicated by the identification information and a store where the user has purchased the commodity. The information may be any information if the purchased commodity and the store where the commodity is purchased can be specified. However, for example, the commodity and the store may be specified using a commodity code uniquely allocated to each commodity or a store code allocated to each store.

The identification information for identifying the purchaser needs to store in advance a correspondence relation with the user ID managed in the system according to the present invention. That is, by storing the correspondence between the identification information and the user ID as a database, it is possible to specify the user ID of the purchaser of the commodity. As an example of reference to the database, for example, it is conceivable to refer to a database in which a correspondence relation between the user ID and the ID for settling means registered in association with the same user is stored in advance to specify the user ID of the user who has used the ID for settling means for purchase of the commodity Since the commodity code managed in the system and the commodity code managed in the settling means operation server, the store server, or the store terminal do not always coincide with each other, a database in which a correspondence relation is stored in advance for the commodity code may be included.

It is also possible to adopt a configuration for presenting, to the store terminal used by the user at the time of the purchase of the commodity or the store server, that the viewing completion ID has been acquired at the time of the purchase. In that case, the recommended store purchase certification unit 15 may receive, from the store terminal or the store server, the information of the viewing completion ID and the commodity purchase information presented to the store terminal used by the user at the time of the purchase of the commodity or the store server to certifying that the user who has acquired the viewing completion ID has purchased the commodity at the recommended store.

The reward determination unit 16 has a function of determining a reward to the video provider according to a predetermined reward determination rule decided in advance when the recommended store purchase certification unit 15 certifies that the commodity related to the viewing completion ID has been purchased in the recommended store by the user who has acquired the viewing completion ID. Here, the reward determination rule refers to a rule for determining a reward for the video provider. The reward may be any reward but, for example, a fixed amount of money may be set as the reward every time one commodity is purchased by the user or an amount at a predetermined ratio to a price of a purchased commodity may be set as the reward. The reward may be electronic money, a point of a retail business or a service business, or a real object other than cash. That is, anything with which the video provider can enjoy some merit can be the reward. Note that any method may be adopted about who bears and contributes the reward imparted to the video provider may. However, for example, it is conceivable that the commodity seller or the recommended store used for purchase bear the reward or the commodity seller and the recommended store used for purchase bear the reward together.

The reward processing unit 17 has a function of executing processing based on the reward determined by the reward determination unit 16. As a specific example of the processing, it is conceivable to, for example, transfer an amount determined as the reward to the video provider or impart a point.

The storage unit 18 has a function of storing data necessary for various kinds of processing performed in the management server 10 and data obtained as a result of the processing. For example, it is conceivable to manage a database in which a user ID and personal information of a user are stored, a database in which a correspondence relation between a user ID and identification information related to the same person is stored, a database in which a correspondence relation between commodity codes is stored, and the like.

Figure 3:
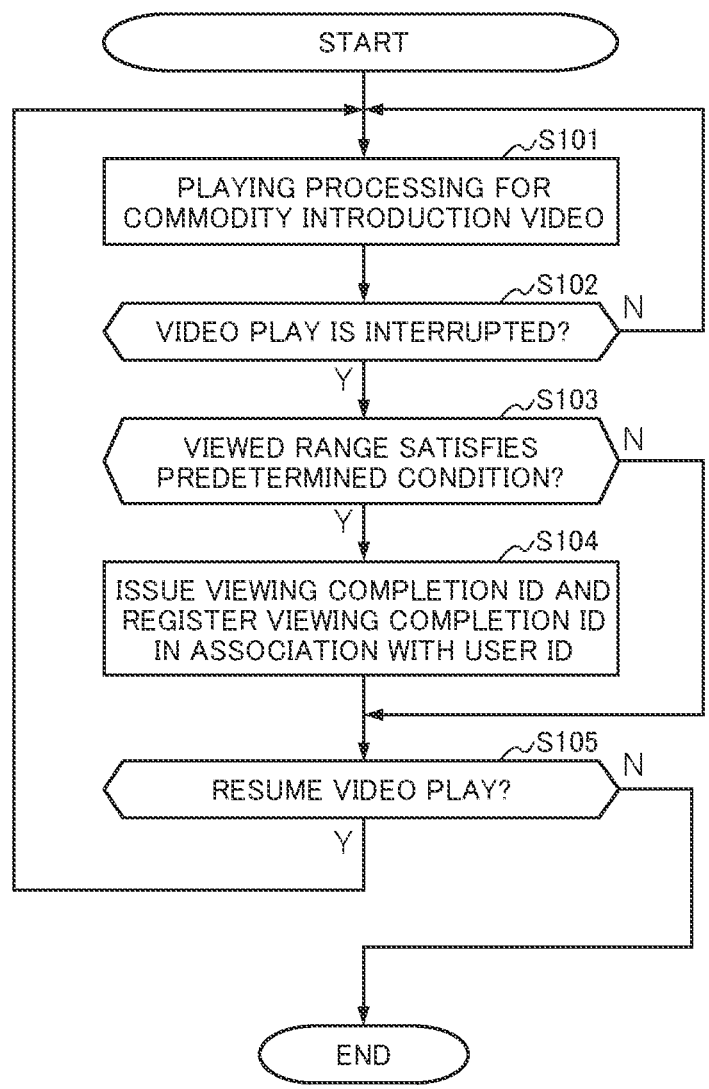
FIG. 3 is a flowchart illustrating a flow of viewing completion ID issuance processing in the management server 10 according to the present invention.

Subsequently, a flow of viewing completion ID issuance processing in the management server 10 according to the present invention is explained. FIG. 3 is a flowchart illustrating a flow of the viewing completion ID issuance processing in the management server 10 according to the present invention. As illustrated in FIG. 3, the viewing completion ID issuance processing in the management server 10 is started with a start of playing processing for a commodity introduction video by the user as a trigger (step S101). Next, the management server 10 determines whether or not the playing processing for the commodity introduction video is interrupted (step S102). As long as the playing processing for the commodity introduction video is not interrupted (S102—N), the management server 10 returns to step S101 and continues the playing processing for the commodity introduction video. When the playing processing for the commodity introduction video is interrupted (S102—Y), the management server 10 determines whether a range viewed by the user in the commodity introduction video satisfies a predetermined condition (step S103). When the viewed range satisfies the predetermined condition (S103—Y), the management server 10 issues a viewing completion ID to the viewing user and registers the viewing completion ID in association with the user ID (step S104). When the viewed range does not satisfy the predetermined condition (S103—N), the management server 10 shifts to step S105. Then, the management server 10 waits for an input about whether to resume the video play by the user (step S105). When the user resumes the video play (S105—Y), the management server 10 returns to step S101. When the user stops the video play (S105—N), the management server 10 ends the viewing completion ID issuance processing. Note that the viewing completion ID issuance processing does not always need to be performed by the management server 10. The viewing completion ID issuance processing may be executed in an external server that stores the commodity introduction video.

FIG. 4 is an explanatory diagram for explaining an example of video distribution provided based on the management server 10 according to the present invention. FIG. 4(*a*) illustrates an example of a screen of a site that introduces commodity information. In the example illustrated in FIG. 4(*a*), commodity information is posted and a "purchase" button and a "video play" button are provided on the same screen. When pressing the "purchase" button, the user can shift to the purchase procedure and, when pressing the "video playback" button, the user can shift to the playing of the commodity introduction video. When a plurality of commodity introduction videos are registered for a commodity, the user may shift to a selection screen for a commodity introduction video.

Subsequently, FIG. 4(b) illustrates an example of a play screen for a commodity introduction video. The play screen for a commodity introduction video includes a "purchase" button for shifting to a purchase procedure besides operation buttons necessary for general video play such as pause, play, stop, rewind, and fast forward of viewing. When a played range of the commodity introduction video satisfies a predetermined condition, the viewing completion ID is issued to the viewing user. The issuance of the viewing completion ID may be displayed on the video play screen. Note that a graphical user interface (GUI) for video play illustrated in FIG. 4(b) is only an example. A GUI of for the application for video play may be any GUI. Note that it is also possible to adopt an operation button for skipping a playing part up to a part where viewing is essential in order to acquire the viewing completion ID.

FIG. 4(c) illustrates an example of display of a recommended store. For example, by displaying a screen illustrated in FIG. 4 (c) after the playing of the commodity introduction video is stopped, the recommended store introduced in the commodity introduction video may be displayed again as text. In addition, a link button may be provided in a display part of the recommended store or a store name may be set for link guidance to make it possible to transition to sites of stores. In addition, a "buy this as it is" button may be provided on the screen on which the playing of the commodity introduction video is stopped to make it possible to shift to the purchase processing. A purchase destination at the time when the "purchase" button is operated does not always need to be the recommended store but may be set to the recommended store. The recommended store is introduced in the commodity introduction video or the recommended store is displayed and introduced on the screen as illustrated in FIG. 4(c), whereby the user who has viewed the recommended store can recognize the recommended store.

Figure 5:
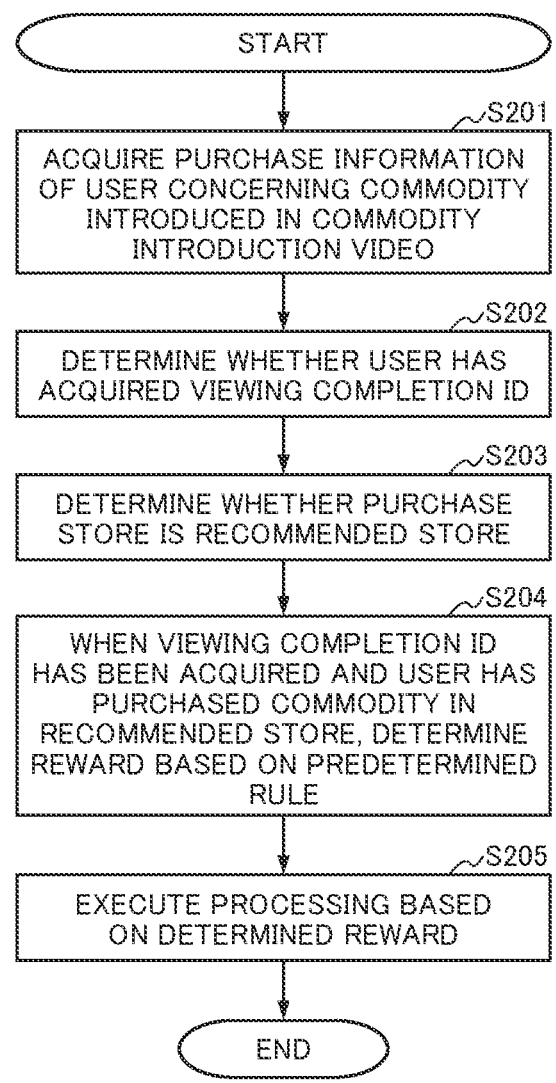
FIG. 5 is a flowchart illustrating a flow of reward determination processing in the management server 10 according to the present invention.

Subsequently, a flow of the reward determination processing in the management server 10 according to the present invention will be described. FIG. 5 is a flowchart illustrating the flow of the reward determination processing in the management server 10 according to the present invention. As illustrated in FIG. 5, the reward determination processing in the management server 10 is started by acquiring commodity purchase information of a user concerning a commodity introduced in the commodity introduction video and identification information of the user who is a purchaser (step S201). Subsequently, management server 10 specifies a user ID based on the acquired identification information and determines whether a viewing completion ID is issued to the user ID (step S202). Subsequently, the management server 10 determines whether a purchase store indicated in the commodity purchase information is a recommended store (step S203). Then, when determining that the user has purchased a commodity in the recommended store in a state where the viewing completion ID has been acquired, the management server 10 determines a reward for the video provider based on a predetermined reward determination rule (step S204). Finally, the management server 10 executes processing based on the determined reward (step S205) and ends the reward determination processing. Note that the steps illustrated in FIG. 5 does not always need to be executed in the management server 10. A configuration may be adopted in which some steps are executed in an external server or terminal such as the settling means operation server 60, the store side server 70, or the store terminal 80 and the execution result is received by the management server 10. That is, as the management server 10, the management server 10 is capable of finally determining that the user has purchased a commodity at the recommended store in the state in which the viewing completion ID has been acquired, the processing in the process may be executed in a device other than the management server 10.

As explained above, according to the management server 10 of the present invention, it is determined whether the commodity introduction video created by the video provider conforms to the commodity introduction rule, the commodity introduction video conforming to the commodity introduction rule is registered in association with the corresponding commodity, when the recommended store is introduced at the time of commodity purchase in the commodity introduction video, the recommended store information is registered in association with the commodity introduction video, when viewing of the commodity introduction video by the user satisfies the predetermined condition, the viewing completion ID is issued and registered in association with the user ID for identifying the user, it is certified that the user who has acquired the viewing completion ID has purchased the commodity introduced in the commodity introduction video in the recommended store, and, when the purchase of the commodity in the recommended store by the user who has acquired the viewing completion ID is certified, the reward for the video provider is determined according to the predetermined reward determination rule set in advance. Therefore, it is possible to appropriately impart the reward to the video provider of the commodity introduction video who has guided the user to the recommended store and contributed to the purchase of the commodity by the user. With such a configuration, the commodity seller can expect an increase in sales of the commodity, the store introduced as the recommended store can expect an increase in sales, and the video provider can expect the reward. Therefore, it is possible to construct a mechanism in which the commodity seller, the store, and the video provider have advantages. Further, since the video provider can impart an appropriate reward if the viewer purchases the commodity in the guided store, a motivation to produce the commodity introduction video to make it easily to appeal attractions of the commodity. As a result, improvement in the quality of the commodity introduction video can be expected.

Second Embodiment

In the first embodiment, the case in which the user who has acquired the viewing completion ID based on one commodity introduction video purchases the commodity in the recommended store is explained as an example. However, it is sufficiently conceivable to view a plurality of commodity introduction videos related to the same commodity before the user purchases the commodity. At that time, a reward may be paid to video providers of all the commodity introduction videos. However, in that case, a burden on a person who bears the reward increases. Therefore, in order to limit the number of video providers that can acquire the reward, one or two or more video providers that can acquire the reward may be specified when the user who has acquired the viewing completion ID for the respective plurality of commodity introduction videos related to the same commodity purchases the commodity. In the following explanation, a second embodiment is explained with reference to the drawings. However, components functioning the same as in the first embodiment are denoted by the same reference numerals and signs and explanation of the components is omitted.

Figure 6:
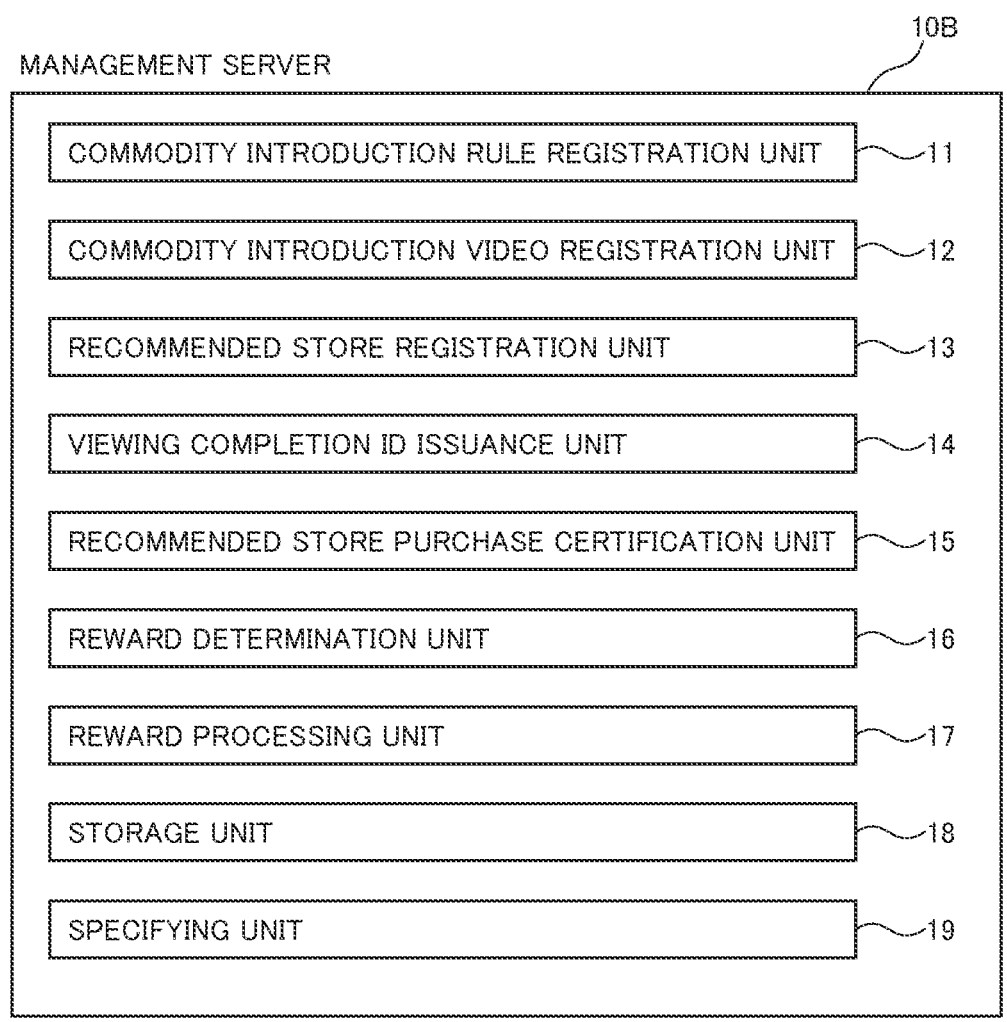
FIG. 6 is a block diagram illustrating another example of a configuration of a management server 10B.

FIG. 6 is a block diagram illustrating another example of a configuration of a management server 10B. The management server 10B illustrated in FIG. 6 further includes a specifying unit 19 in addition to the management server 10 explained in the first embodiment.

The specifying unit 19 has a function of, when the recommended store purchase certification unit 15 certifies that a commodity related to a viewing completion ID has been purchased in a recommended store by a user who has acquired a viewing completion ID and the user has acquired a plurality of viewing completion IDs issued based on a plurality of commodity introduction videos, specifying one or two or more commodity introduction videos that have contributed to the purchase of the commodity according to a predetermined specifying rule determined in advance from the plurality of commodity introduction videos. Here, the specifying rule refers to a rule for specifying one or two or more video providers that can acquire a reward when a user who has acquired a viewing completion ID for a respective plurality of commodity introduction videos related to the same commodity purchases the commodity. The specifying rule may be any rule if one or two or more video providers from that can obtain the reward can be specified.

The specifying rule may a rule for specifying, as a commodity introduction video from which the reward can be obtained, a video whose browsing order corresponds to specific order such as a commodity introduction video browsed last, a commodity introduction video browsed first, or a commodity introduction video browsed second from the last. Besides, the specifying rule may a rule for specifying two or more commodity introduction videos as commodity introduction videos from which the reward can be obtained. For example, commodity introduction videos up to predetermined number-th viewing order from the first and commodity introduction videos up to predetermined number-th viewing order from the last may be specified as the commodity introduction videos from which the reward can be obtained.

When the user has viewed a plurality of commodity introduction videos, the specifying rule may specify a commodity introduction video having the longest viewing time among the plurality of commodity introduction videos as the commodity introduction video from which the reward can be obtained. Consequently, the user can obtain the largest number of information or evaluate a commodity introduction video by which the user is affected most and, for example, provision of a commodity introduction video that allows the user to continue viewing without getting bored can be expected. When the user has viewed a plurality of commodity introduction videos, the specifying rule may specify a commodity introduction video having the largest number of viewing times among the plurality of commodity introduction videos as the commodity introduction video from which the reward can be obtained.

The specifying rule may be capable of selecting a commodity introduction video considered to have contributed to the purchase decision by the purchaser and specifies a predetermined number (for example, at most n (n is a natural number)) of commodity introduction videos out of the selected commodity introduction videos as the commodity introduction videos from which the reward can be obtained. As a method of selection by the purchaser, for example, commodity introduction videos viewed by the purchaser may be presented to the purchaser as a list, a commodity introduction video considered to have contributed to the purchase decision by the purchaser and selected by checking a check box may be transmitted to the management server 10 as selection information, or information describing a URL of a commodity introduction video considered to have contributed by the purchaser may be transmitted to the management server 10 as the selection information. That is, the method may be any method if the method is capable of acquiring the selection information concerning the commodity introduction video considered to have contributed by the purchaser in the management server 10.

The number of commodity introduction videos that can be selected as the commodity introduction video considered to have contributed by the purchaser may be limited to a predetermined number (for example, m or less (m is a natural number)). Further, the selection information may include ranking information obtained by the purchaser ranking the plurality of commodity introduction videos according to the magnitudes of contribution degrees. For example, when it is necessary to specify a smaller number of commodity introduction videos than the number selected by the purchaser as commodity introduction videos contributing to the sales (when m the number selected by the purchaser>n), n commodity introduction videos may be specified as the commodity introduction videos contributing to the sales of the commodity in descending order of ranks in the ranking information. Based on the ranking information, a difference may be provided in rewards imparted to the video provider.

The specific examples of the specifying rule explained above may be respectively used in combination. A method of deciding the specifying rule can be different according to a type of a commodity, a sales method, or the like. Since the specifying rule is determined in advance, competition occurs among a plurality of providers and improvement in quality of the commodity introduction video can be expected.

When one or two or more commodity introduction videos are specified by the specifying unit 19, the reward determination unit 16 determines a reward for video providers of the specified one or two or more commodity introduction videos.

Figure 7:
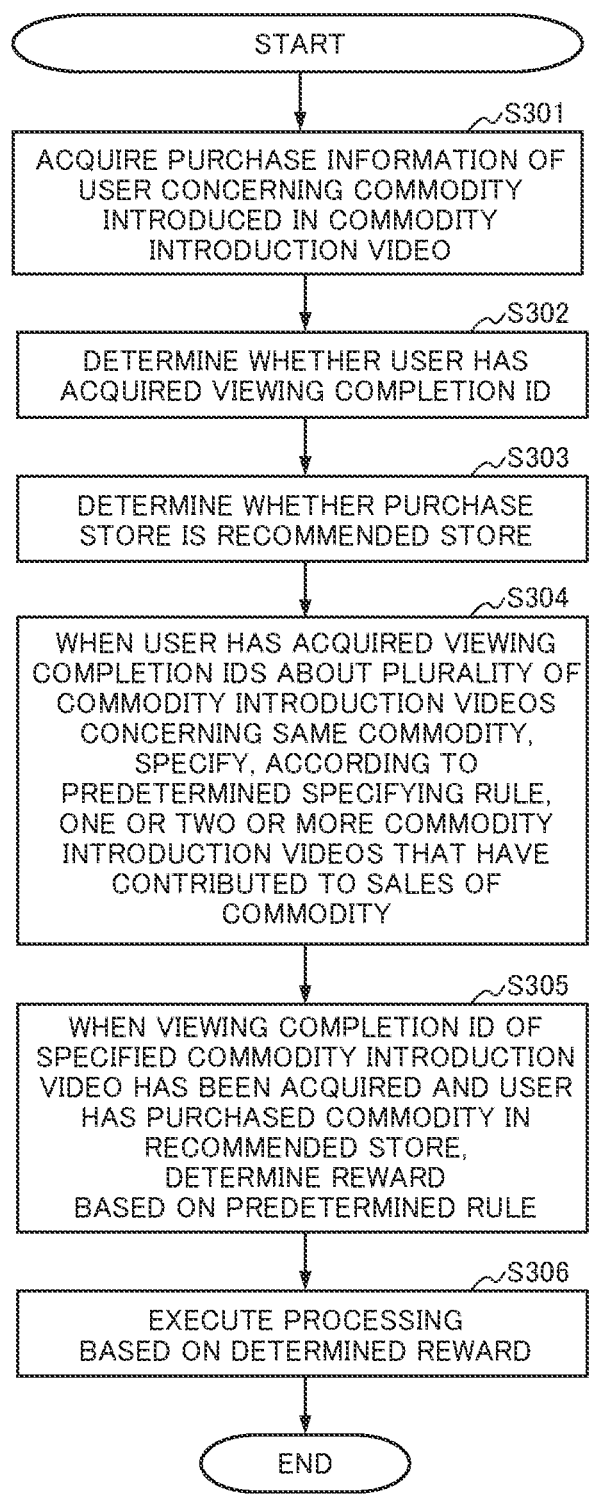
FIG. 7 is a flowchart illustrating a flow of reward determination processing in the management server 10B according to the present invention.
Figure 8:
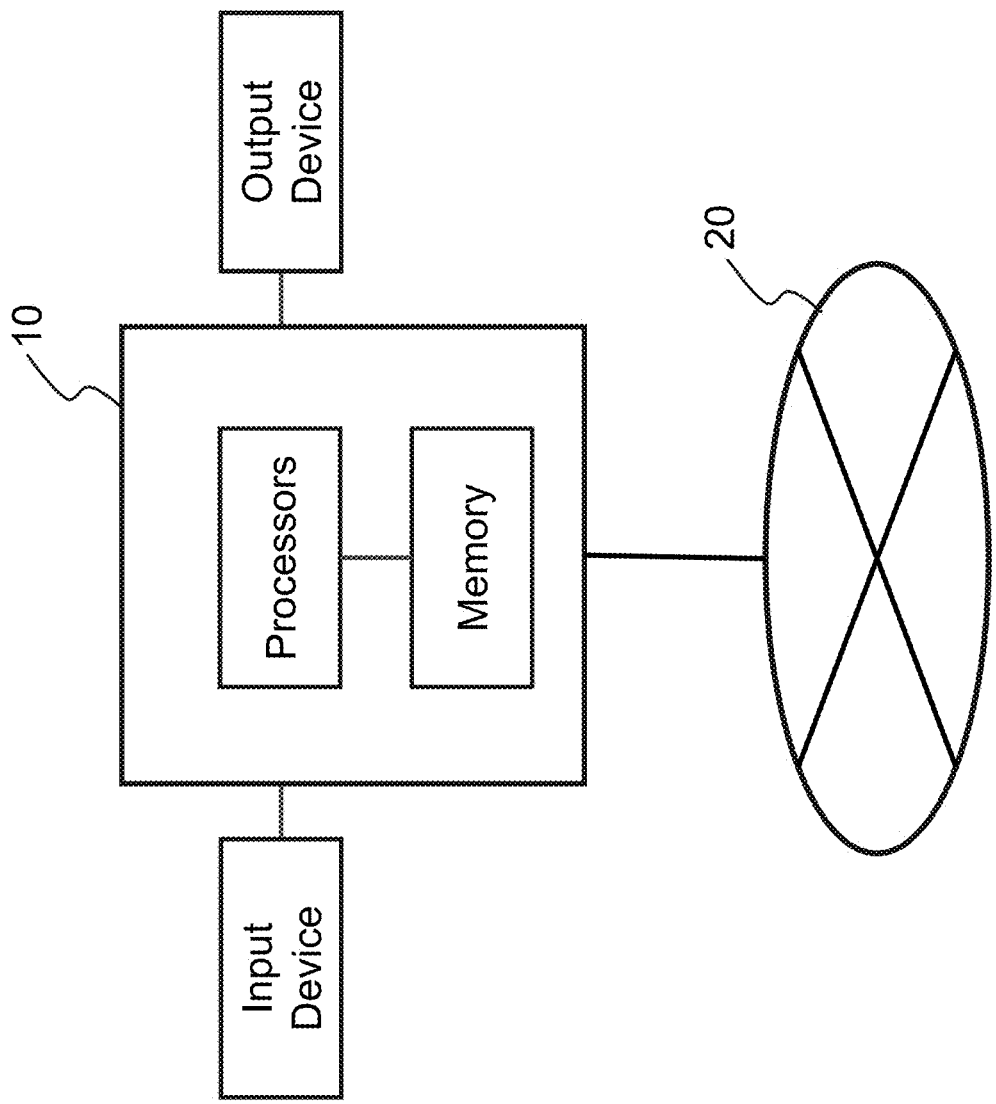
FIG. 8 is a block diagram illustrating an example of components of the management server 10.

Subsequently, a flow of the reward determination processing in the management server 10B according to the present invention is explained. FIG. 7 is a flowchart illustrating the flow of the reward determination processing in the management server 10B according to the present invention. As illustrated in FIG. 7, the reward determination processing in the management server 10B is started by acquiring commodity purchase information of a user concerning a commodity introduced in a commodity introduction video and identification information of the user who is a purchaser (step S301). Subsequently, the management server 10B specifies a user ID based on the acquired identification information and determines whether a viewing completion ID is issued for the user ID (step S302). Subsequently, the management server 10B determines whether a purchase store indicated in the commodity purchase information is a recommended store (step S303). Subsequently, when the user has acquired viewing completion IDs for a plurality of commodity introduction videos concerning the same commodity, the management server 10B specifies, according to a predetermined specifying rule, one or two or more commodity introduction videos that have contributed to sales of the commodity (step S304). Then, when it is determined that a viewing completion ID of the specified commodity introduction video has been acquired and the commodity has been purchased in the recommended store, the management server 10B determines a reward for a video provider of the specified commodity introduction video based on a predetermined reward determination rule (step S305). Finally, the management server 10B executes processing based on the determined reward (step S306) and ends the reward determination processing. Note that the steps illustrated in FIG. 7 do not always need to be executed in the management server 10. A configuration may be adopted in which some steps are executed in an external server or terminal such as the settling means operation server 60, the store side server 70, or the store terminal 80 and an execution result is received by the management server 10B. That is, if the management server 10B is capable of finally determining that the user has purchased the commodity in the recommended store in a state where the viewing completion ID has been acquired, the processing in the process may be executed in a device other than the management server 10B.

As explained above, with the management server 10B according to the present invention, in addition to the management server 10 according to the first embodiment, when a plurality of viewing completion IDs issued based on a plurality of commodity introduction videos has been acquired by a user who has acquired a viewing completion ID when it is certified that a commodity related to the viewing completion ID has been purchased in a recommended store, when the user has acquired the plurality of viewing completion IDs, one or two or more commodity introduction videos that have contributed to purchase of the commodity are specified from the plurality of commodity introduction videos according to a predetermined specification rule, and a reward for a video provider of the specified one or two or more commodity introduction videos is determined. Therefore, the reward can be granted only to one or two or more commodity introduction videos that have contributed to purchase of the commodity by the user. That is, since a competition for being specified occurs among the video providers of the commodity introduction videos, as a result, improvement in the quality of the commodity introduction videos can be expected. Since the number of video providers that can obtain the reward can be limited, a burden on a person who bears the reward can be reduced.

In the first embodiment, it is assumed that limitation concerning the reward provision is not set. However, some limitation may be set for the reward provision. For example, an expiration date for imparting the reward to the video provider of the commodity introduction video when the user who has acquired the viewing completion ID for the commodity introduction video purchases the commodity in the recommended store may be provided. When money or points are granted as the reward, a total amount of the reward may be determined and the reward may be granted until the total amount of the reward is reached but the reward may not be granted after the total amount of the reward is reached. In the case of a plurality of times of the commodity purchase based on the same user, the number of times the reward imparted to the purchase of the same user may be limited. By imposing some limitation on the granting of the reward in this way, it is possible to reduce the burden on the person who bears the reward or set an upper limit of the burden.

It goes without saying that the various configurations explained in the embodiments explained can be applied in combination as appropriate as long as there is no contradiction besides being applied alone.

REFERENCE SIGNS LIST 10, 10B Management server
11 Commodity introduction rule registration unit
12 Commodity introduction video registration unit
13 Recommended store registration unit
14 Viewing completion ID issuance unit
15 Recommended store purchase certification unit
16 Reward determination unit
17 Reward processing unit
18 Storage unit
19 Specifying unit
20 Communication network
30 Terminal (commodity seller)
40 Terminal (video provider)
50 Terminal (user)
60 Settling means operation server
70 Store side server
80 Terminal (store)

The invention claimed is:

1. A management server that communicates through a network, including one or more processors,
the processors configured:
to receive, for each commodity, a predetermined commodity introduction rule that needs to be observed concerning creation of a commodity introduction video for introducing a commodity, wherein the commodity introduction rule is transmitted from a terminal of a commodity seller through the network and registered in association with the commodity;
to register the commodity introduction video in association with the commodity corresponding thereto, wherein the commodity introduction video is transmitted from a terminal of a video provider through the network, and is certified to meet the commodity introduction rule registered in the commodity introduction rule registering unit;
to register recommended store information indicating one or more of recommended store introduced in the commodity introduction video in association with the commodity introduction video when the one or more recommended stores at a time of commodity purchase in the commodity introduction video are introduced in a state capable of being recognized by a user;
to issue a viewing completion ID and to register the viewing completion ID in association with a user ID that identifies a user who has viewed the commodity introduction video wherein the processors communicate with a terminal of the user to which the commodity introduction video is transmitted from the management server through the network, and determine whether or not a predetermined condition regarding the viewing of the user is satisfied, and issues the viewing completion ID with the user ID when the predetermined condition is confirmed satisfied;
to certify that the user who has acquired the viewing completion ID has purchased the commodity in one of the recommended stores introduced in the commodity introduction video, wherein, when the processors receive, through the network, purchaser and commodity purchase information including at least three identifications: 1) user ID to identify a purchaser who purchased, 2) store ID to identify a purchase store at which the user purchased, and 3) commodity ID to identify a purchased commodity, the processors determine whether or not
the purchaser, which is identified with the user ID, has been registered to acquire the viewing completion ID regarding the purchased commodity, which is identified with the commodity ID, referring to the viewing completion ID, and the purchase store, which is identified with the store ID, has been registered as the recommended store referring to the recommended store;
to determine a reward to the video provider according to a predetermined reward determination rule decided in advance when the processors certify that the user who purchased the purchased commodity has acquired the viewing completion ID of the purchased commodity, and the purchase store has been registered as the recommended store; and
to execute processing based on the reward determined to the video provider according to the predetermined reward determination rule.

2. The management server according to claim 1, wherein the processors receive identification information for identifying the purchaser and commodity purchase information transmitted from a store terminal used at the time of the purchase of the commodity, a store server, a settling means operation server, or a user terminal used at the time of the purchase, specify the user ID owned by the purchaser indicated by the identification information, and determine whether the viewing completion ID is registered in association with the user ID to certify that the user who has acquired the viewing completion ID has purchased the commodity at the recommended store.

3. The management server according to claim 2, wherein the identification information is an ID for settling means registered in association with the user for use of the settling means, and
the processors refer to a database that stores in advance a correspondence relation between the user ID and the ID for settling means registered in association with the same user to specify the user ID of the user who has used the ID for settling means for the purchase of the commodity.

4. The management server according to claim 1, wherein the processors are configured to receive the viewing completion ID and the commodity purchase information presented at the time of the purchase to a store terminal or a store server used by the user at the time of the purchase of the commodity from the store terminal or the store server to certify that the user who has acquired the viewing completion ID has purchased the commodity in the recommended store.

5. The management server according to claim 1, wherein the processors are configured to specify one or two or more of the commodity introduction videos contributing to the purchase of the commodity according to a predetermined specifying rule decided in advance out of a plurality of the commodity introduction videos when the user has acquired a plurality of the viewing completion IDs issued based on the plurality of commodity introduction videos when the processors certify that the commodity related to the viewing completion ID has been purchased in the recommended store by the user who has acquired the viewing completion ID, and
the processors determine the reward to the video provider of the one or two or more commodity introduction videos specified by the processors.

6. The management server according to claim 1, wherein the predetermined condition is to specify, by a selection of the user, one or two or more of the commodity introduction videos contributing to the purchase of the commodity among the commodity introduction videos.

7. The management server according to claim 1, wherein the processors monitor the terminal of the user, and when the commodity introduction video is played and then stopped, the processors determine whether or not the predetermined condition regarding the viewing of the user is satisfied.

8. The management server according to claim 7, wherein the commodity introduction video contains a check part that was set in advance,
the predetermined condition for the viewing completion ID is that the check part is played at the terminal of the user, and
the processors issue the viewing completion ID when the check part of the commodity introduction video is monitored played.

9. The management server according to claim 7, wherein the predetermined condition for the viewing completion ID is a ratio of play time with respect to a total length of the commodity introduction video, and
the processors count play time of the commodity introduction video at the terminal of the user, and issue the viewing completion ID when the counted play time passes the ratio.

10. The management server according to claim 1, wherein the purchaser and commodity purchase information is transferred to the management server through the network from a terminal of the purchase store.

11. The management server according to claim 1, wherein the purchaser and commodity purchase information is transferred to the management server through the network from a settling operation server that is operated by a company that completed a purchase transaction between the purchaser and the purchase store.

12. A non-transitory storage medium storing a management program for causing a management server that communicates through a network to realize:
a commodity introduction rule registering function of receiving, for each commodity, a predetermined commodity introduction rule that needs to be observed concerning creation of a commodity introduction video for introducing a commodity wherein the commodity introduction rule is transmitted from a terminal of a commodity seller through the network and registered in association with the commodity;
a commodity introduction video registering function of registering the commodity introduction video in association with the commodity corresponding thereto wherein the commodity introduction video is transmitted from a terminal of a video provider through the network, and is certified to meet the commodity introduction rule registered in the commodity introduction rule registering function;
a recommended store registering function of registering recommended store information indicating one or more of recommended stores introduced in the commodity introduction video in association with the commodity introduction video when the one or more recommended stores at a time of commodity purchase in the commodity introduction video are introduced in a state capable of being recognized by a user;
a viewing completion ID issuing function of issuing a viewing completion ID and registering the viewing completion ID in association with a user ID that identifies a user who has viewed the commodity introduction video wherein the viewing completion ID issuing function communicates with a terminal of the user to which the commodity introduction video is transmitted from the management server through the network, and determine whether or not a predetermined condition regarding the viewing of the user is satisfied, and issues the viewing completion ID with the user ID when the predetermined condition is confirmed satisfied;

a recommended store purchase certifying function of certifying that the user who has acquired the viewing completion ID has purchased the commodity in one of the recommended stores introduced in the commodity introduction video, wherein, when the recommended store purchase certifying function receives, through the network, purchaser and commodity purchase information including at least three identifications: 1) user ID to identify a purchaser who purchased, 2) store ID to identify a purchase store at which the user purchased, and 3) commodity ID to identify a purchased commodity, the recommended store purchase certifying function determines whether or not the purchaser, which is identified with the user ID, has been registered to acquire the viewing completion ID regarding the purchased commodity, which is identified with the commodity ID, referring to the viewing completion ID issuing function, and the purchase store, which is identified with the store ID, has been registered as the recommended store referring to the recommended store registering function;

a reward determining function of determining a reward to the video provider according to a predetermined reward determination rule decided in advance when the recommended store purchase certifying function certifies that the user who purchased the purchased commodity has acquired the viewing completion ID of the purchased commodity, and the purchase store has been registered as the recommended store; and a reward processing function of executing processing based on the reward determined by the reward determining function.

13. The non-transitory storage medium according to claim 12, wherein the viewing completion ID issuing function receives identification information for identifying the purchaser and commodity purchase information transmitted from a store terminal used at the time of the purchase of the commodity, a store server, a settling means operation server, or a user terminal used at the time of the purchase, specifies the user ID owned by the purchaser indicated by the identification information, and determines whether the viewing completion ID is registered in association with the user ID to certify that the user who has acquired the viewing completion ID has purchased the commodity at the recommended store.

14. The non-transitory storage medium according to claim 13, wherein the identification information is an ID for settling means registered in association with the user for use of the settling means, and a database is referred to, wherein the database stores in advance a correspondence relation between the user ID and the ID for settling means registered in association with the same user to specify the user ID of the user who has used the ID for settling means for the purchase of the commodity.

15. The non-transitory storage medium according to claim 12, wherein the viewing completion ID and the commodity purchase information are received by the management server, wherein the viewing completion ID and the commodity purchase information are presented at the time of the purchase to a store terminal or a store server used by the user at the time of the purchase of the commodity from the store terminal or the store server to certify that the user who has acquired the viewing completion ID has purchased the commodity in the recommended store.

16. The non-transitory storage medium according to claim 12, further comprising:

a video specifying function of specifying one or two or more of the commodity introduction videos contributing to the purchase of the commodity according to a predetermined specifying rule decided in advance out of a plurality of the commodity introduction videos when the user has acquired a plurality of the viewing completion IDs issued based on the plurality of commodity introduction videos when the recommended store purchase certifying function certifies that the commodity related to the viewing completion ID has been purchased in the recommended store by the user who has acquired the viewing completion ID, wherein the reward processing function determines the reward to the video provider of the one or two or more commodity introduction videos specified by the video specifying function.

17. The non-transitory storage medium according to claim 12, wherein the predetermined condition is to specify, by a selection of the user, one or two or more of the commodity introduction videos contributing to the purchase of the commodity among the commodity introduction videos.

18. The non-transitory storage medium according to claim 12, wherein the viewing completion ID issuing function monitors the terminal of the user, and when the commodity introduction video is played and then stopped, the viewing completion ID issuing function determines whether or not the predetermined condition regarding the viewing of the user is satisfied.

19. The non-transitory storage medium according to claim 18, wherein the commodity introduction video contains a check part that was set in advance, the predetermined condition for the viewing completion ID is that the check part is played at the terminal of the user, and the viewing completion ID is issued when the check part of the commodity introduction video is monitored played.

20. The non-transitory storage medium according to claim 18, wherein the predetermined condition for the viewing completion ID is a ratio of play time with respect to a total length of the commodity introduction video, and play time of the commodity introduction video at the terminal of the user is counted, and the viewing completion ID is issued when the counted play time passes the ratio.

* * * * *